Jan. 23, 1968
H. N. IPSEN
3,365,182
LOADING ARRANGEMENT FOR SHAKER HEARTH
HEAT TREATING FURNACES
Filed Aug. 18, 1965
2 Sheets-Sheet 2
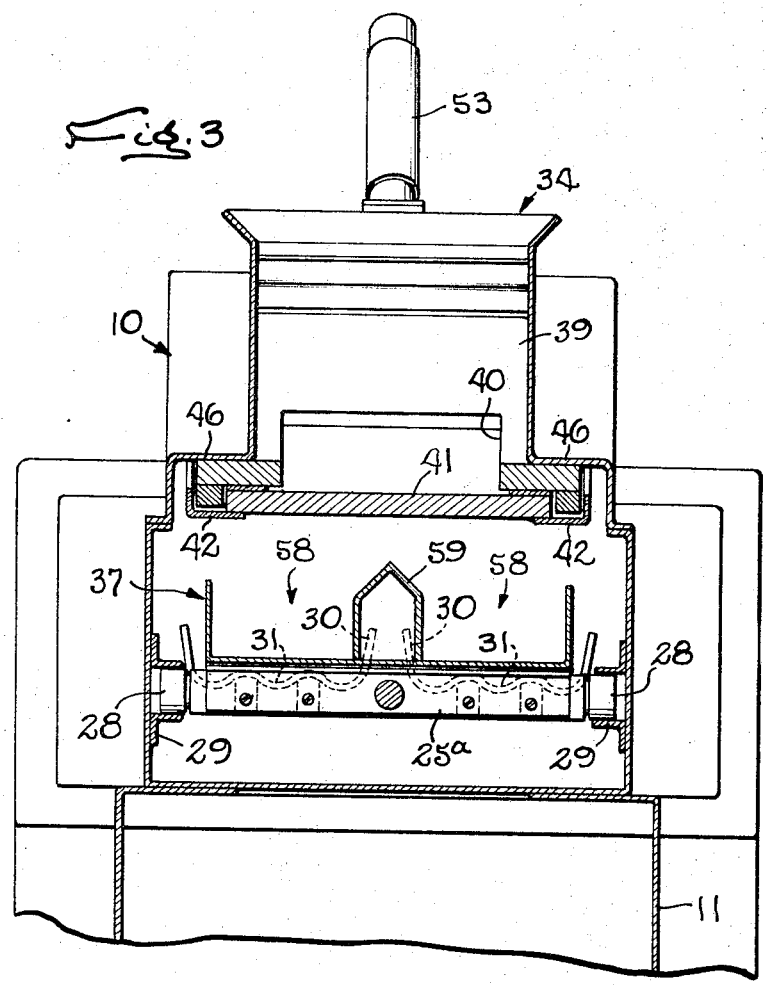
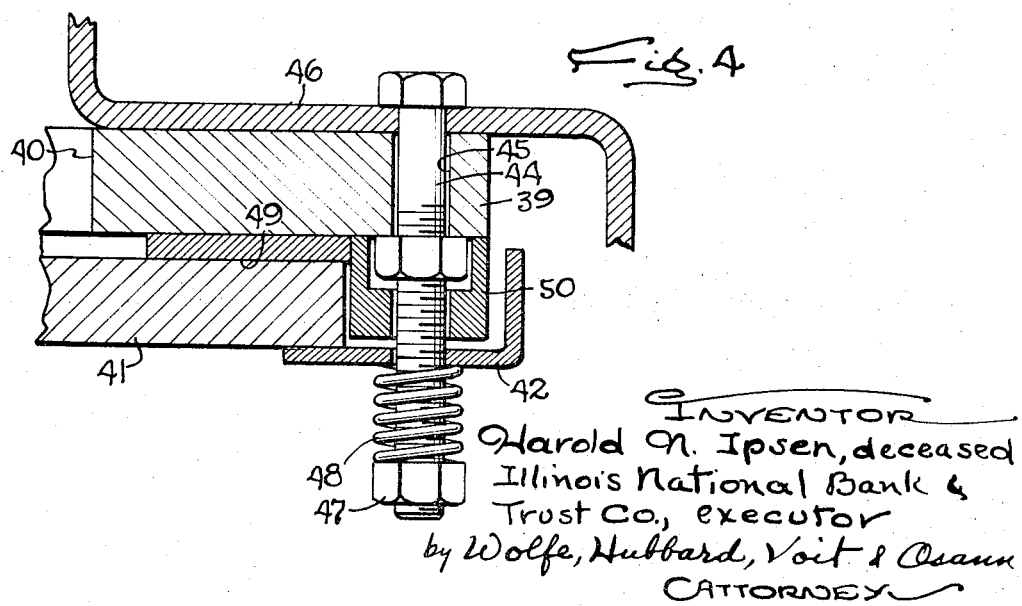
INVENTOR
Harold N. Ipsen, deceased
Illinois National Bank &
Trust Co., executor
by Wolfe, Hubbard, Voit & Osann
ATTORNEY

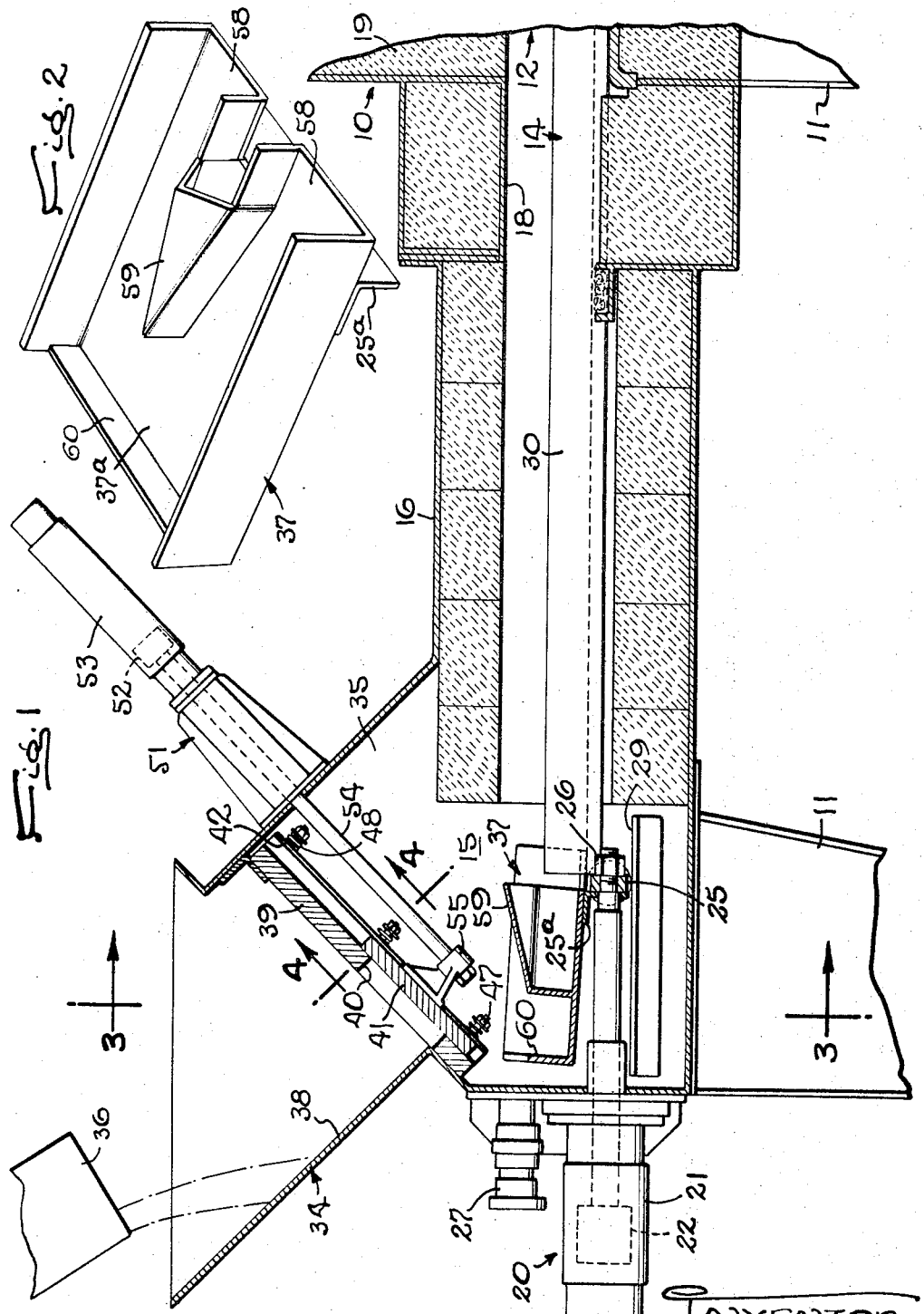

United States Patent Office 3,365,182
Patented Jan. 23, 1968

3,365,182
LOADING ARRANGEMENT FOR SHAKER HEARTH HEAT TREATING FURNACES
Harold N. Ipsen, deceased, late of Rockford, Ill., by The Illinois National Bank and Trust Company, executor, Rockford, Ill., assignor to Alco Standard Corporation, Philadelphia, Pa., a corporation of Pennsylvania
Filed Aug. 18, 1965, Ser. No. 480,825
7 Claims. (Cl. 263—21)

ABSTRACT OF THE DISCLOSURE

A heat treating furnace of the type having a hearth that is agitated endwise back and forth to advance workpieces step-by-step through the heating chamber. A closed vestibule is formed at the loading end of the hearth with a partitioned chute in the vestibule mounted on and movable with the hearth to receive batches of workpieces and divide the same into two rows moving along two longitudinal trays of the hearth. Above the chute is a power-operated door for opening and closing a loading opening communicating with a hopper that receives workpieces from a conveyor. The door is sealed against the bottom wall of the hopper and thus maintains the furnace atmosphere when closed, opening to admit charges and then reclosing to reseal the furnace.

---

This invention relates to a furnace for heat treating metal workpieces fed through a heating chamber on a shaker hearth which is agitated endwise back and forth to advance the parts thereon. More particularly, the invention pertains to apparatus for loading workpieces into a heat treating furnace of the type in which the hearth is divided, that is, the workpieces are carried through the heating chamber on a plurality of parallel trays which are agitated back and forth, and in which a protective atmosphere in the furnace prevents oxidation of the parts.

The general object of this invention is to provide a new and improved loading arrangement for a shaker hearth furnace which lessens the flow of atmosphere from the furnace and the flow of outside air into the furnace during loading.

A more specific object is to provide a loading arrangement for a shaker hearth furnace in which a quantity of workpieces can be temporarily stored and then fed quickly into a controlled atmosphere vestibule for distribution in equal amounts onto the individual trays of a divided shaker hearth for transportation through the furnace.

Other objects and advantages of the invention will become apparent from the following detailed description taken in connection with the accompanying drawings, in which FIGURE 1 is a fragmentary vertical cross-sectional view of a heat treating furnace embodying the novel loading arrangement of the present invention, FIG. 2 is a perspective view of the shaker chute, FIG. 3 is a fragmentary cross-sectional view along the line 3—3 of FIG. 1 and FIG. 4 is an enlarged fragmentary cross-sectional view taken along the line 4—4 of FIG. 1.

As shown in the drawings for purposes of illustration the invention is embodied in a furnace of the shaker hearth type for heat treating metallic workpieces. The furnace is formed by a walled enclosure 10 supported above the floor on legs 11 and lined with suitable insulating material such as fire brick defining a heating chamber 12. The chamber 12 is heated by some suitable means to raise the temperature of and thus treat, the workpieces passed therethrough. Frequently the atmosphere used in the chamber in an inert gas to prevent oxidation of the pieces as they are heated.

Workpieces to be treated are loaded onto a furnace hearth 14 in a preheating vestibule 15 formed by a cabinet 16 for passage through an insulated throat 18 opening through the front wall 19 of the chamber 12. In shaker hearth furnaces, the hearth holds the workpieces on a general horizontal surface and is agitated back and forth to advance the workpieces through the furnace, the hearth moving first relatively slowly in one direction to carry the workpieces a predetermined distance forward, and then moving back rapidly so the inertia of the workpieces slides them step by step along the hearth surface and through the furnace.

This agitation and reciprocating movement of the hearth is produced by a shaker mechanism mounted on the cabinet 16 (FIG. 1) outside the furnace and including, in this instance, a reciprocating pneumatic motor 20 comprising a cylinder 21 and a piston 22 guided in the cylinder for back and forth movement along a path paralleling the path of the work through the furnace. The piston rod projects through a lug 25 on the underside of the outer end of the hearth and is secured thereto by a nut 26 threaded onto the rod, the adjacent end portion of the hearth being supported on rollers 28 (see FIG. 3) resting on tracks 29. The other end portion of the hearth is also supported for movement such that reciprocation of the piston moves the hearth back and forth.

By restricting the evacuation of fluid from the cylinder on the side of the piston not being pressurized, the rate of travel of the piston can be regulated. Thus the piston and driven hearth are moved to the right (in FIG. 1) slowly to carry with the hearth the workpieces resting thereon. The reverse stroke of the piston is rapid for abrupt movement of the hearth, with the result that the inertia of the parts overcomes the frictional force holding them in place on the hearth. Accordingly, the parts slide along the hearth a distance approximately equal to the stroke of the piston and hearth with a usual stroke of the hearth being one-half to three-quarters of an inch. A peepsight assembly 27 permits viewing of the interior of the vestibule.

The hearth surface on which the workpieces lie is formed by a pair of elongated trays 30 extending side-by-side through the furnace. It is important that the workpieces be evenly distributed evenly along the trays so that each piece is heated to the same temperature. Thus, the bottoms 31 of the trays are corrugated lengthwise along the trays to facilitate the sliding of the workpieces therealong, and to limit sidewise movement of the workpieces which might result in the pieces bunching or piling up. The workpieces therefore are loaded onto the trays evenly for uniform distribution as they proceed through the furnace, the loading being effected in a manner to limit the exchange of the outside atmosphere and that of the heating chamber atmosphere, especially if a non-oxidizing or partial vacuum atmosphere is used.

In accordance with the present invention a predetermined quantity of the workpieces are loaded into the furnace through a hopper 34 positioned above the vestibule 15 and having a specially sealed door in the bottom thereof sealing the vestibule and disposed above a shaker chute 37 at the outer end of the hearth and inclined downwardly towards the latter. By activating a door operating mechanism, the hopper door is opened to allow a quantity of workpieces to drop onto the shaker chute which in turn divides the workpieces into even flows for deposit onto the hearth trays and subsequent passage through the furnace. In this instance, the hopper 34 is supported above an opening 35 in the top of the cabinet 16 and receives workpieces preferably in a continuous flow, from a conveyor 36. The pieces fall down the inclined side wall 38 of the hopper to rest against the opposite sloping bottom wall 39 thereof. An opening 40 is formed in the bottom wall 39 where it joins the side wall 38 to admit workpieces from the hopper into the vestibule 15, the flow therethrough being controlled by the opening and closing of sealed door 41. As shown in FIGS. 1 and 4, this door is supported in ways 42 of L-shaped cross-section on each side of the opening 40 and extending along the sides of the opening, such that the door may be moved from a position covering the opening to a position alongside the bottom 39 to one side of the opening. In this position of the door, the workpieces fall freely from the hopper through the opening with little or no horizontal motion. The ways 42 are held by nuts 47 on bolts 44 extending through alined holes 45 in the bottom wall 39 and the side walls 46 of the hopper. A compression spring 48 is held around each bolt 44 and interposed between the nut 47 and the way to spring bias the way and thereby hold the door tightly against a seal 49 between the bottom wall 39 and the door. In this manner the door is held in tight engagement with the bottom of the hopper to effectively seal the opening 40 against loss of the atmosphere from inside the furnace while the door is closed and to prevent the workpieces from wedging between the door and bottom wall and thus hinder movement of the door. A spacer 50 maintains the door in lateral alinement between the ways.

To open and close the door, a double-acting mechanism 51 is provided comprising a piston 52 guided in a pneumatic cylinder 53 for movement along a line parallel with the path of the door 41. A rod 54 connects the piston with a carrier in the form of bracket 55 on the door 41 and by introducing pressure fluid into one end of the cylinder to either side of the piston, the piston is forced to the other end of the cylinder to thereby move the door relative to the opening 40.

When this door mechanism 51 is activated to open the door, the workpieces in the hopper 34 slide down the inclined walls 38 and 39 of the hopper to fall through the opening 40 onto the shaker chute 37 fixed on the hearth by a bracket 25a secured to the lug 35. As shown in FIG. 2, this chute includes a bottom surface 37a for holding the workpieces and is formed with an open end 58 and a streamlined partition 59 extending from this open end partway back to the wall 60 opposite the open end. The chute bottom 37a is inclined downwardly towards the open end 58 to slide the workpieces relatively quickly, as the hearth is agitated, towards the open end adjacent the hearth where they will spread evenly, generally abutting one another (or if small articles, will level out to an even depth) preparatory to being deposited onto the hearth in two approximately equal flows, one on each side of the partition 59 and each in alinement with one of the trays 30.

With this loading arrangement, the workpieces are fed at a predetermined rate into the hopper, to then be dropped onto the chute 37 by opening the door 40 for short periods at regular intervals, with the chute distributing them in even flows onto the trays of the hearth. A timer (not shown) can be used to program the actuation of the door opening mechanism 51 to thereby open and close the door of the hopper at regular intervals and since the conveyer is carrying the workpieces at a steady rate to the hopper, thereby regulating the rate the workpieces are fed into the furnace.

I claim as my invention:

1. In a heat treating furnace, the combination of, a wall structure defining a heating chamber and including an opening therein for passing workpieces into the chamber, a pair of elongated trays forming a hearth and extending generally horizontally through said chamber with the adjacent edges thereof substantially parallel, means supporting said hearth in said chamber for reciprocating back-and-forth movement toward and away from said opening for advancing workpieces on said tray surfaces step-by-step through said chamber, an actuator for moving said hearth back-and-forth, a second walled structure forming a closed vestibule in communication with said chamber opening, an open top chute in said vestibule supported for reciprocating movement with said hearth, said chute having a bottom surface downwardly inclined toward and terminating adjacent said trays for distributing workpieces from the chute onto said tray surfaces, a partition supported on said chute surface and positioned adjacent the trays to extend between the adjacent edges thereof to a hopper disposed above the chute, to divide the flow of workpieces from said chute onto said trays, said second walled structure and having an opening in the bottom thereof communicating with said vestibule and positioned over said chute for dropping workpieces from the hopper onto said chute, and a door for closing said hopper opening whereby workpieces can be loaded into said hopper and thereafter be dropped onto said chute for distribution onto said hearth trays and passage through the furnace chamber.

2. In a heat treating furnace, the combination of, a wall structure defining a heating chamber and including an opening therein for passing workpieces into the chamber, a pair of elongated trays supported forming a hearth and extending generally horizontally through said chamber, means supporting said hearth in said chamber for reciprocating back-and-forth movement toward and away from said opening for advancing workpieces thereon step-by-step through said chamber, a second walled structure forming a closed vestibule in communication with said chamber opening, an open top chute in said vestibule supported for reciprocating movement with said hearth, said chute having a bottom surface downwardly inclined toward and terminating adjacent said trays for distributing workpieces from the chute onto said tray surfaces, a hopper disposed above said second walled structure and having an opening in the bottom thereof communicating with said vestibule and positioned over said chute for dropping workpieces from the hopper onto said chute, a door for closing said hopper opening whereby workpieces can be loaded into said hopper and thereafter be dropped onto said chute for distribution onto said hearth and passage through the furnace chamber, and means for sealing between said door and hopper opening to prevent the exchange of atmosphere through said hopper opening when the door is closed.

3. In a heat treating furnace, the combination of, a wall structure defining a heating chamber and including an opening therein for passing workpieces into the chamber, a pair of elongated trays forming a hearth and extending generally horizontally through said chamber, means supporting said hearth in said chamber for reciprocating back-and-forth movement for advancing workpieces thereon step-by-step through said chamber, a second walled structure forming a closed vestibule in communication with said chamber opening, an open top chute in said vestibule supported for reciprocating movement with said hearth, said chute having a surface downwardly inclined toward and terminating adjacent said trays for distributing workpieces from the chute onto said tray surfaces, a hopper disposed above said second walled structure including an opening in the bottom thereof communicating with said vestibule and positioned over said chute for dropping workpieces from the hopper onto said chute, and a door for closing said hopper opening whereby workpieces can be loaded into said hopper and thereafter be dropped onto said chute for distribution onto said hearth and passage through the furnace chamber.

4. In a heat treating furnace, the combination of, a wall structure defining a heating chamber and including an opening therein for passing workpieces into the chamber, a hearth having a surface for holding workpieces, means supporting said hearth in said chamber for reciprocating back-and-forth movement for advancing workpieces thereon step-by-step through said chamber, a second walled structure forming a closed vestibule in communication with said chamber opening, an open top chute in said vestibule supported for reciprocating movement with said hearth, said chute having a surface downwardly inclined toward and adjacent said hearth for distributing workpieces from the chute onto said hearth, a hopper disposed above said second walled structure including an opening in the bottom thereof communicating with said vestibule and positioned over said chute for dropping workpieces from the hopper onto said chute, and a door for closing said hopper opening whereby workpieces can be loaded into said hopper and thereafter be dropped onto said chute for distribution onto said hearth and passage through the furnace chamber.

5. In a heat treating furnace, the combination of, a wall structure defining a heating chamber and including an opening therein for admitting workpieces into the chamber, a hearth in said chamber having a surface for supporting workpieces, means supporting said hearth in said chamber for reciprocating back-and-forth movement to advance workpieces thereon step-by-step through said chamber, means on said hearth disposed beneath said opening for receiving workpieces therethrough, a hopper on said wall structure for delivering workpieces through said opening to said hearth, said hopper having a wall inclined downwardly and toward said opening for sliding of workpieces toward the opening, means for delivering a flow of workpieces to said hopper to move along said wall toward said opening, a door movably mounted on said structure for back-and-forth movement between a first position closing said opening and a second position away from the opening thereby to control the movement of workpieces from said hopper to said hearth, means around said door sealing said opening in said first position and thereby controlling the passage of gas through the opening, and selectively operable mechanism for moving said door back and forth between said positions thereby to permit the movement of workpieces from said hopper to said hearth and then reseal said opening.

6. A heat treating furnace as defined in claim 5 in which said door is slidable transversely of said inclined wall to close and open said opening, said mechanism including a reciprocating actuator and a carrier on said actuator connected to said door to move the latter back and forth, said sealing means including surfaces surrounding said opening and facing toward said door, and means urging said door into tight engagement with said surfaces.

7. A heat treating furnace as defined in claim 6 in which said surfaces are formed by one side of a wall forming the bottom of said hopper and extending transversely of said inclined wall, said yieldable means comprising springs acting between said bottom wall and said door to urge the latter into a tight sealing engagement with said one side.

References Cited
UNITED STATES PATENTS

| | | | |
|---|---|---|---|
| 2,021,072 | 11/1935 | Machlet | 263—21 |
| 2,137,930 | 11/1938 | Turk | 263—21 X |
| 2,247,823 | 7/1941 | Somes | 263—21 |
| 2,420,126 | 5/1947 | Curll et al. | 263—21 |
| 2,521,591 | 9/1950 | Martin | 263—21 |
| 3,199,854 | 8/1965 | Ipsen | 263—21 X |

JAMES W. WESTHAVER, *Primary Examiner.*

JOHN J. CAMBY, *Examiner.*